(12) United States Patent
Rupp

(10) Patent No.: US 11,046,279 B2
(45) Date of Patent: Jun. 29, 2021

(54) ADAPTIVE BACKUP STRUCTURE FOR AIRBAG SUPPORT

(71) Applicant: NIO USA, Inc., San Jose, CA (US)

(72) Inventor: Jeffrey D. Rupp, Ann Arbor, MI (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 16/717,900

(22) Filed: Dec. 17, 2019

(65) Prior Publication Data

US 2020/0139921 A1   May 7, 2020

Related U.S. Application Data

(62) Division of application No. 15/703,422, filed on Sep. 13, 2017, now Pat. No. 10,507,783.

(51) Int. Cl.
*B60R 21/231* (2011.01)
*B60K 35/00* (2006.01)
*B60R 21/205* (2011.01)
*B60R 21/0136* (2006.01)
*B60R 21/21* (2011.01)
*B60R 21/239* (2006.01)
*B60R 21/233* (2006.01)
(Continued)

(52) U.S. Cl.
CPC ............ *B60R 21/231* (2013.01); *B60K 35/00* (2013.01); *B60R 21/0136* (2013.01); *B60R 21/205* (2013.01); *B60R 21/21* (2013.01); *B60R 21/233* (2013.01); *B60R 21/239* (2013.01); *B60R 21/2346* (2013.01); *B60K 2370/67* (2019.05); *B60K 2370/739* (2019.05); *B60K 2370/81* (2019.05); *B60R 2021/01252* (2013.01); *B60R 2021/2395* (2013.01); *B60R 2021/23324* (2013.01)

(58) Field of Classification Search
CPC .......... B60K 2370/81; B60K 2370/816; B60K 2370/822; B60R 21/231; B60R 21/205; B60R 21/0136
See application file for complete search history.

(56) References Cited

U.S. PATENT DOCUMENTS

| 5,265,668 A | 11/1993 | Fisher |
| 5,470,103 A | 11/1995 | Vaillancourt et al. |
| 6,431,583 B1 | 8/2002 | Schneider |

(Continued)

FOREIGN PATENT DOCUMENTS

| DE | 102009012417 | 6/2010 |
| DE | 102010050699 | 8/2011 |

(Continued)

OTHER PUBLICATIONS

Final Action for U.S. Appl. No. 15/806,624, dated Nov. 20, 2020, 15 pages.
(Continued)

*Primary Examiner* — Nicole T Verley
(74) *Attorney, Agent, or Firm* — Sheridan Ross P.C.

(57) ABSTRACT

In a vehicle having a display mounted forward of a passenger seat on a dashboard and angled toward a driver seat adjacent the passenger seat, the display is moveable from the angled position to a position flush with the dashboard, and an airbag system is configured to deploy an airbag cushion that displaces the display from the angled position to the position flush with the dashboard to ensure that the airbag cushion has an adequate backup or support surface.

20 Claims, 14 Drawing Sheets

(51) Int. Cl.
    *B60R 21/2346*     (2011.01)
    *B60R 21/01*     (2006.01)

(56) References Cited

U.S. PATENT DOCUMENTS

| | | |
|---|---|---|
| 6,962,363 B2 | 11/2005 | Wang et al. |
| 7,070,201 B2 | 7/2006 | Song et al. |
| 8,482,534 B2 | 7/2013 | Pryor |
| 8,820,778 B2 | 9/2014 | Fukawatase |
| 9,096,130 B2 | 8/2015 | Pechnyk et al. |
| 9,193,375 B2 | 11/2015 | Schramm et al. |
| 9,248,799 B2 | 2/2016 | Schneider et al. |
| 9,409,538 B2 | 8/2016 | Gorman et al. |
| 9,446,735 B1 | 9/2016 | Jayasuriya et al. |
| 9,487,177 B2 | 11/2016 | Schneider et al. |
| 9,542,029 B2 | 1/2017 | Bassier et al. |
| 9,731,602 B2 | 8/2017 | Kim et al. |
| 10,040,414 B1 | 8/2018 | Stevens et al. |
| 10,336,283 B2 | 7/2019 | Rickenbach et al. |
| 10,507,783 B2 | 12/2019 | Rupp |
| 2003/0001366 A1 | 1/2003 | Debler et al. |
| 2008/0024463 A1 | 1/2008 | Pryor |
| 2009/0128307 A1 | 5/2009 | Hentsch et al. |
| 2012/0268665 A1 | 10/2012 | Yetukuri et al. |
| 2014/0103624 A1 | 4/2014 | Breed |
| 2015/0343986 A1 | 12/2015 | Schneider et al. |
| 2016/0159292 A1 | 6/2016 | Wall et al. |
| 2016/0266782 A1 | 9/2016 | Rawlinson |
| 2017/0274859 A1 | 9/2017 | Heurlin et al. |
| 2017/0297606 A1 | 10/2017 | Kim et al. |
| 2019/0135220 A1 | 5/2019 | Rupp et al. |

FOREIGN PATENT DOCUMENTS

| | | |
|---|---|---|
| DE | 102013015534 | 5/2014 |
| JP | 05-254381 | 10/1993 |
| JP | 2007-069828 | 3/2007 |
| JP | 2014-159254 | 9/2014 |

OTHER PUBLICATIONS

Official Action for U.S. Appl. No. 15/459,980, dated Sep. 6, 2017, 6 pages.
Notice of Allowance for U.S. Appl. No. 15/459,980, dated Mar. 28, 2018, 7 pages.
Official Action for U.S. Appl. No. 15/703,422, dated Apr. 17, 2019, 6 pages, Restriction Requirement.
Notice of Allowance for U.S. Appl. No. 15/703,422, dated Jul. 25, 2019, 10 pages.
Official Action for U.S. Appl. No. 15/806,624, dated Apr. 1, 2020, 6 pages, Restriction Requirement.
Official Action for U.S. Appl. No. 15/806,624, dated Jun. 24, 2020, 26 pages.

ADAPTIVE BACKUP STRUCTURE FOR AIRBAG SUPPORT

CROSS REFERENCE TO RELATED APPLICATIONS

The present application is a division of and claims the benefits of and priority to U.S. patent application Ser. No. 15/703,422, filed on Sep. 13, 2017, of the same title, the entire disclosure of which is hereby incorporated herein by reference, in its entirety, for all that it teaches and for all purposes.

FIELD

The present disclosure is generally directed to vehicle systems, and more particularly to vehicle airbag systems.

BACKGROUND

The inclusion of airbags in passenger vehicles has largely become standard, in many cases due to government safety regulations. Airbags have proven effective at protecting vehicle occupants from more serious injury when the occupied vehicle is involved in a crash. This is due in large part to the ability of airbags to deploy quickly, thus enabling protection of occupants even during crashes that occur at high speeds. When deployed, airbags help to prevent vehicle occupants from excessive movement within the vehicle passenger compartment and associated injuries.

Practical considerations dictate that airbag modules be mounted in close proximity to vehicle occupants, so that the airbag can quickly deploy into a space between the vehicle occupant and the vehicle structure when necessary. Front passenger airbags, for example, are commonly mounted within the instrument panel/cross car beam assembly within the passenger compartment.

DETAILED DESCRIPTION

Embodiments of the present disclosure will be described in connection with a vehicle, and more particularly with respect to an automobile. However, for the avoidance of doubt, the present disclosure encompasses the use of the aspects described herein in vehicles other than automobiles.

Figure 1:
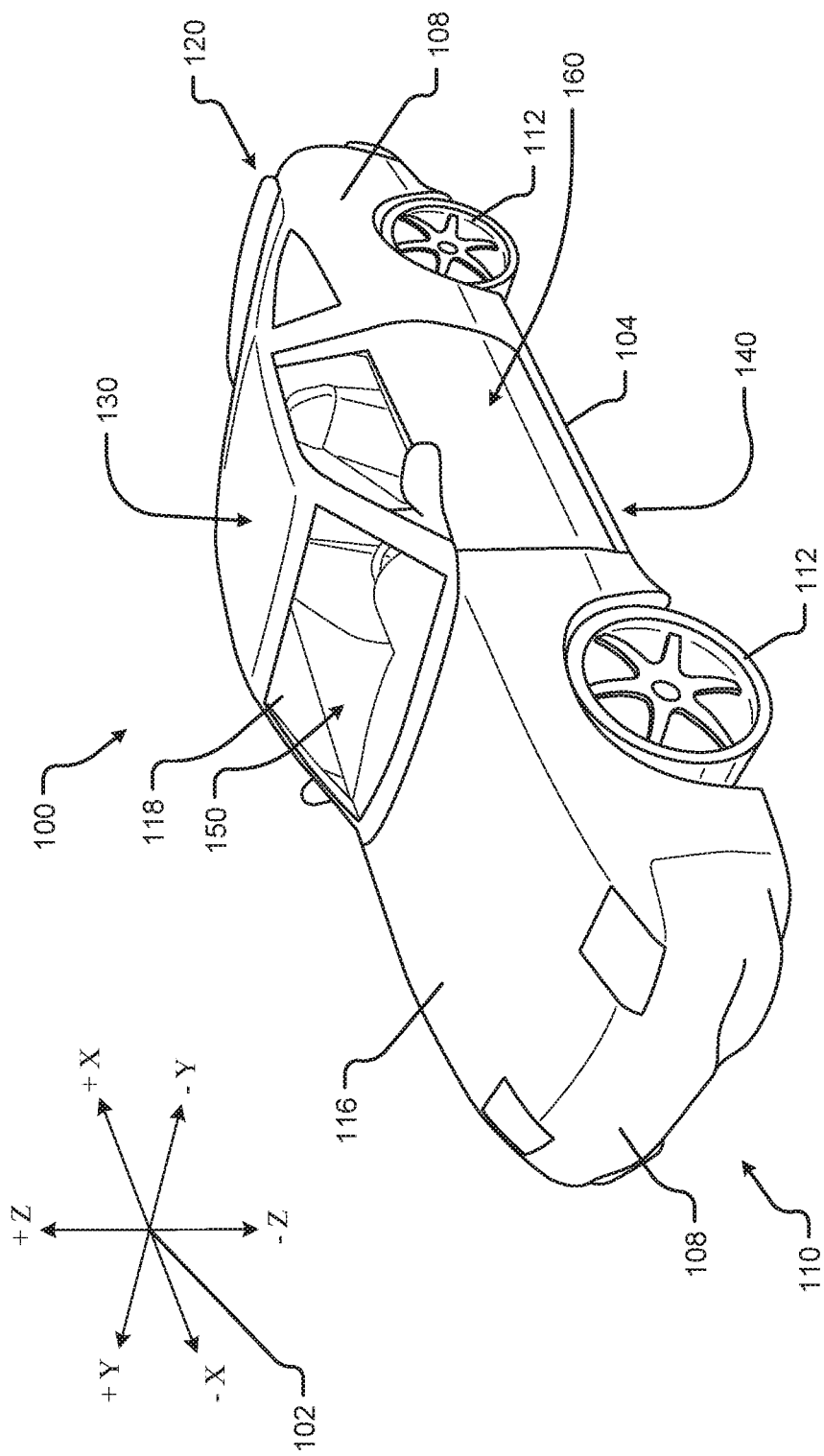
FIG. 1 shows a vehicle in accordance with embodiments of the present disclosure.

FIG. 1 shows a perspective view of a vehicle 100 in accordance with embodiments of the present disclosure. The vehicle 100 comprises a vehicle front 110, vehicle aft 120, vehicle roof 130, at least one vehicle side 160, a vehicle undercarriage 140, and a vehicle interior 150. The vehicle 100 may include a frame 104, one or more body panels 108 mounted or affixed thereto, and a windshield 118. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Coordinate system 102 is provided for added clarity in referencing relative locations in the vehicle 100. In this detailed description, an object is forward of another object or component if the object is located in the −X direction relative to the other object or component. Conversely, an object is rearward of another object or component if the object is located in the +X direction relative to the other object or component.

The vehicle 100 may be, by way of example only, an electric vehicle or a gas-powered vehicle. Where the vehicle 100 is an electric vehicle, the vehicle 100 may comprise one or more electric motors powered by electricity from an on-board battery pack. The electric motors may, for example, be mounted near or adjacent an axis or axle of each wheel 112 of the vehicle, and the battery pack may be mounted on the vehicle undercarriage 140. In such embodiments, the front compartment of the vehicle, referring to the space located under the vehicle hood 116, may be a storage or trunk space. Where the vehicle 100 is a gas-powered vehicle, the vehicle 100 may comprise a gas-powered engine and associated components in the front compartment (under the vehicle hood 116), which engine may be configured to drive either or both of the front wheels 112 and the rear wheels 112. In some embodiments where the vehicle 100 is gas-powered, the gas-powered engine and associated components may be located in a rear compartment of the vehicle 100, leaving the front compartment available for storage or trunk space or for other uses. In some embodiments, the vehicle 100 may be, in addition to a battery-powered electric vehicle and a gas-powered vehicle, a hybrid electric vehicle, a diesel-powered vehicle, or a fuel cell vehicle.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, buses, automobiles, trains, railed conveyances, boats, ships, marine conveyances, submarine conveyances, airplanes, space craft, flying machines, human-powered conveyances, and the like.

Figure 2A:
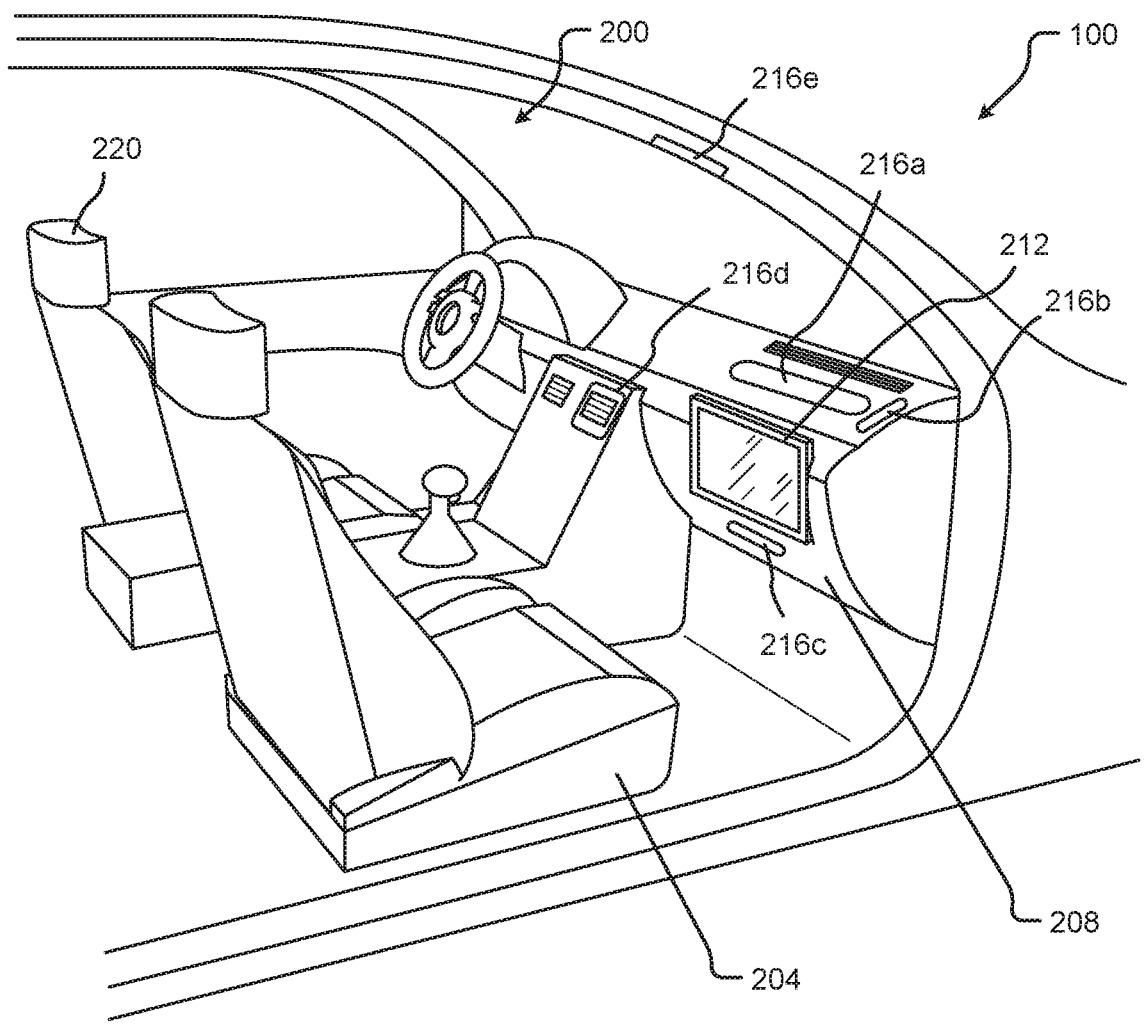
FIGS. 2A and 2B show a passenger compartment of a vehicle such as the vehicle shown in FIG. 1 in accordance with embodiments of the present disclosure.
Figure 2B:
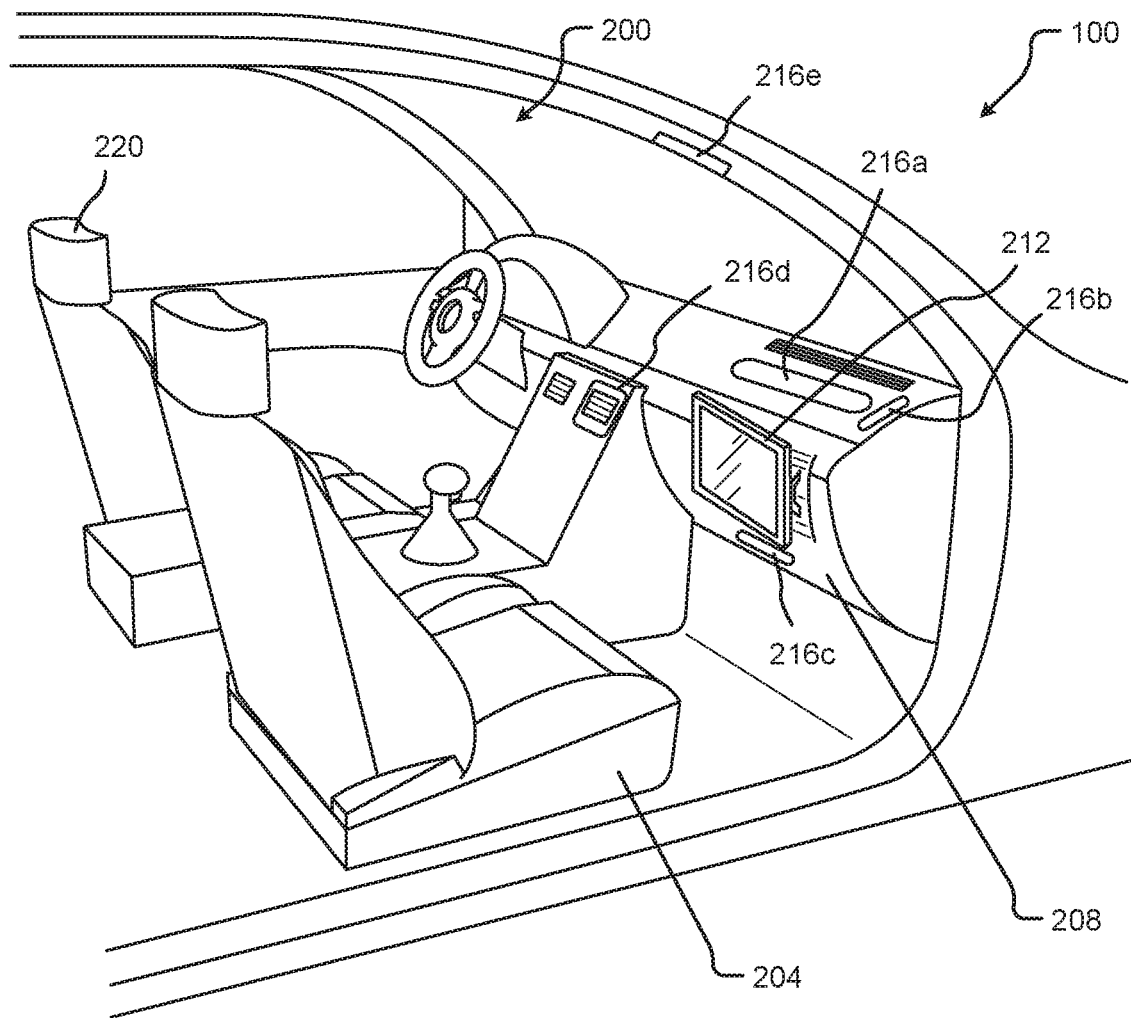

Referring now to FIGS. 2A and 2B, a vehicle passenger cabin 200 of a vehicle 100 according to embodiments of the present disclosure includes a passenger seat 204, and a dashboard or instrument panel or dash panel (all of which terms may be used interchangeably herein) 208 situated forward of the passenger seat 204. A display 212 may be secured to the dashboard 208, which display may be configured for optimal viewing by an occupant of the passenger seat 204 (as shown in FIG. 2A). For example, the display 212 may be positioned flush with or parallel to the dashboard 208, with the display surface pointed directly toward the passenger seat 204. In some embodiments, the display 212 may be angled toward the driver seat 220 as shown in FIG. 2B, whether for optimal viewing by an occupant of the driver seat 220 or for shared viewing by occupants of the driver seat 220 and the passenger seat 204. Also in some embodiments, the display 212 may be angled away from the driver seat 220 (e.g., to avoid distracting a driver), and/or angled upward or downward to provide a better viewing angle for a passenger in the passenger seat 204.

The display 212 may be or comprise an LED screen, an OLED screen, an AMOLED screen, a Super AMOLED screen, a TFT screen, an IPS screen, a TFT-LCD screen, or any other known variety of screen. The display 212 may be or comprise a touchscreen, and may be used to present virtual buttons or other controls for operation of one or more aspects of the vehicle 100 or a system or component thereof.

The use of driver airbag systems and passenger airbag systems to deploy airbags into the space surrounding an occupant of the driver seat 220 and an occupant of the passenger seat 204, respectively, is known in the art. In typical vehicles, a passenger airbag system is positioned in or near the dashboard 208 immediately in front of the passenger seat 204. In a vehicle 100 having a passenger compartment 200 in which a display 212 is positioned on the dashboard 208 in front of the passenger seat 204, however, the display 212 prevents the placement of a passenger airbag system in or near the dashboard 208 and configured to deploy an airbag cushion through the dashboard 208 immediately in front of the passenger seat 204. According to embodiments of the present disclosure, therefore, one or more passenger airbag systems may be positioned to deploy an airbag cushion, for example, through the dashboard at one or more of a position 216a above the display 212, a position 216b to the side of the display 212, and a position 216c underneath the display 212. A passenger airbag system may additionally or alternatively be positioned to deploy an airbag cushion, for example, through the center console at a position 216d, or from the roof or headliner of the vehicle 100 at a position 216e.

An airbag system according to embodiments of the present disclosure—whether used for driver or for passenger protection or otherwise—may comprise, for example, a folded or otherwise stored airbag cushion, an inflator for inflating the airbag cushion, a crash detection system for detecting collisions and triggering the inflator, and a diagnostic monitoring unit for periodically determining whether the airbag system remains operational.

Figure 3A:
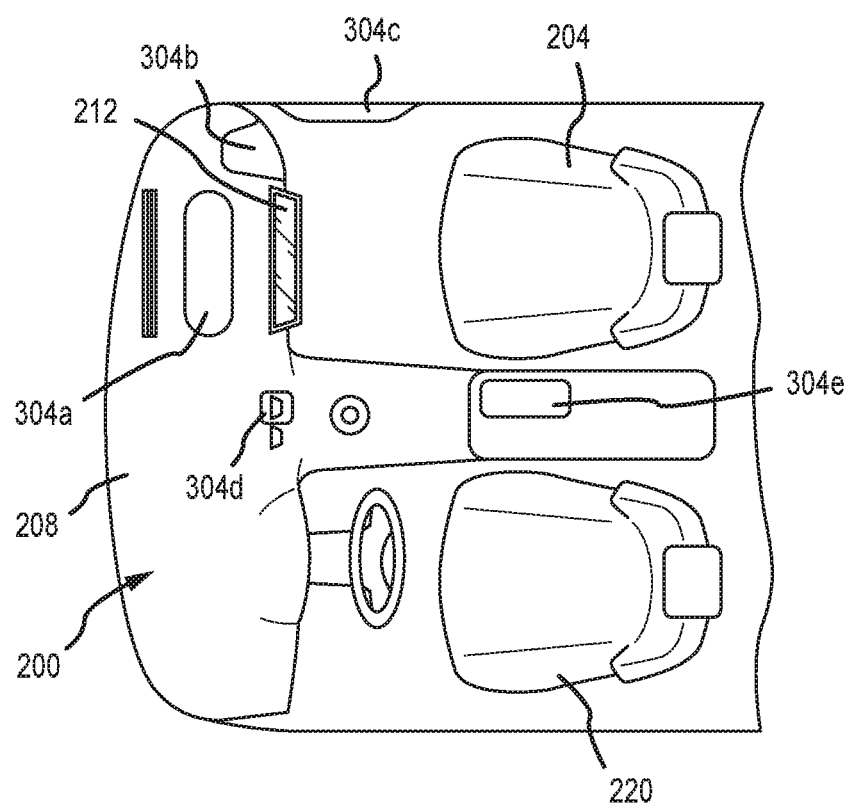
FIG. 3A shows a plan view of a passenger compartment of a vehicle according to one embodiment of the present disclosure, in a first configuration.
Figure 3B:
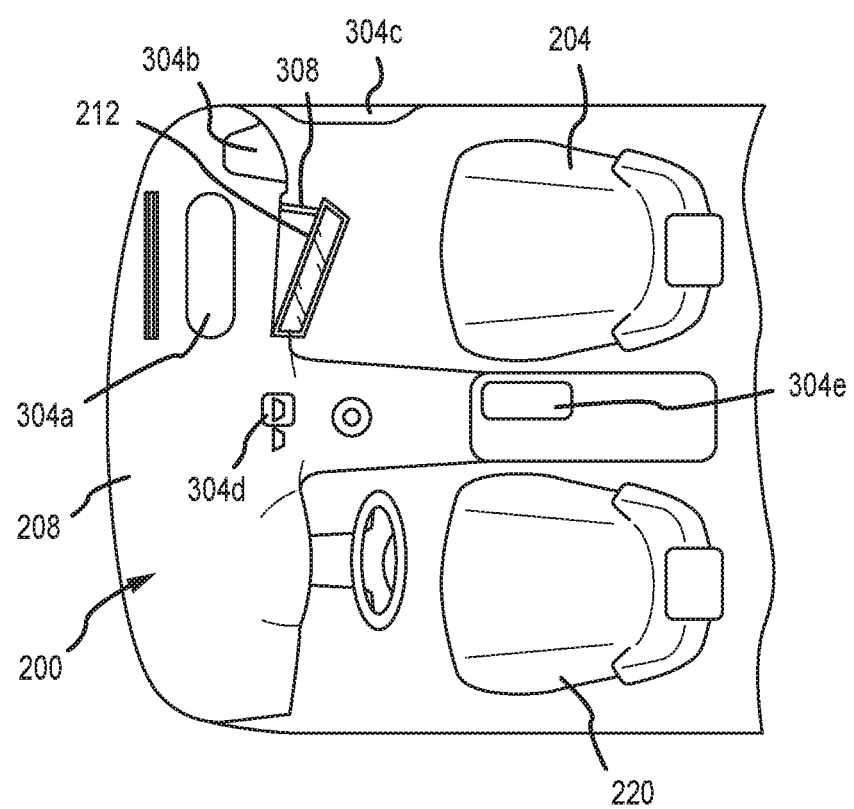
FIG. 3B shows the passenger compartment of FIG. 3A in a second configuration.

FIGS. 3A and 3B show a plan view of a passenger compartment 200 such as may be included in a vehicle 100 in accordance with one embodiment of the present disclosure. The passenger compartment 200 comprises a passenger seat 204 and a driver seat 220. As in FIG. 2, a dashboard 208 is positioned forward of the seats 204 and 220 within the passenger compartment 200, and a display screen 212 is positioned on the dashboard in front of the passenger seat 204. The display screen 212 may be in a first position facing an occupant of the passenger seat 204, as shown in FIG. 3A, or the display 212 may be in a second position angled toward the driver seat 220, as shown in FIG. 3B. In some embodiments, the display 212 is readily moveable between the first position and the second position. Also in some embodiments, the display 212 may be adjustable to the first position, the second position, and one or more positions in between the first position and the second position. A proximate side of the display 212 (which proximate side is nearer the driver seat 220) may be mounted to the dashboard 208 with a hinge or other mechanism that provides a pivot point about which the display 212 can be rotated from the first position to the second position and vice versa, while a distal side of the display 212 (which distal side is farther from the driver seat 220 than the proximate side) may be supported by an arm, track, or mount 308.

In some embodiments, a distal side of the display 212 (which distal side is farther from the driver seat 220 than the proximal side) may be mounted to the dashboard 208 with a hinge or other mechanism that provides a pivot point about which the display 212 can be rotated from a first position facing an occupant of the passenger seat 204, and an angled position. In still other embodiments, the display 212 may additionally or alternatively be rotatably mounted (using a hinge, pivot, or other mechanism) to the dashboard 208 so as to be angled upward and/or downward from a first position flush with the dashboard 208. Persons of ordinary skill in the art will understand, based on the present disclosure, how to adapt the principles of the present disclosure to a display 212 that can be adjusted in ways other than between a first position facing the passenger seat 204 and a second position angled toward the driver seat 220. More specifically, the same concepts disclosed herein for use with a display 212 that is adjustable between the first position and the second position apply to displays 212 that are adjustable between or among the first position and other positions.

Also identified in FIGS. 3A-3B are a number of positions 304 from which an airbag cushion of a passenger airbag system may deploy according to embodiments of the present disclosure. Such positions include a position 304a on the dashboard 208 above and behind the display 212, a position 304b on the dashboard 208 to the side of the display 212, a position 304c on a door or sidewall of the vehicle 100, a position 304d in a center portion of the dashboard 208, and a position 304e on a center console of the dashboard 208.

In order for an airbag in a vehicle 100 to be effective upon deployment, the airbag cushion must deploy into the space between an occupant of the vehicle 100 and a backup or support surface, so that forces exerted on the airbag cushion by an occupant during the collision are opposed by forces exerted on the airbag cushion by the backup or support surface. Airbags are therefore typically designed, for example, to fill the space between an occupant of a vehicle 100 on the one hand and the dashboard 208 and/or front windshield of the vehicle 100. However, standard passenger airbags make no allowances for a large display screen 212 positioned on the dashboard 208 in front of the passenger seat 204, which in a vehicle 100 according to embodiments of the present disclosure may serve as a backup or support surface for a passenger airbag. Standard passenger airbags further make no allowances for a reconfigurable backup or support surface, such that the use of a standard airbag in connection with a moveable display screen 212 could compromise the effectiveness of the airbag and thus passenger safety.

Still further, an angled display 212 positioned immediately in front of an occupant of the passenger seat 204 could also compromise airbag effectiveness. First, the angled display 212 protrudes into the space between the dashboard 208 and the passenger seat 204, which space passenger airbags are designed to fill. Second, the angling of the display 212 may cause an uneven force distribution across the display by an airbag cushion during a collision, with the greatest forces being exerted on the side or edge of the display 212 that protrudes away from the dashboard 208. This uneven force distribution, matched by opposing forces from the edge of the display 212, could cause an airbag cushion to tear or otherwise lose energy-absorbing integrity so as to allow an occupant impact strike-through to a stiff underlying surface. Third, the force of an airbag cushion pressing unevenly against an angled display 212 could cause the display 212 to break, leaving sharp surfaces facing the airbag and/or the occupant of the passenger seat 204, which sharp surfaces could both tear the airbag (or otherwise cause the airbag to lose energy-absorbing integrity) and injure the occupant.

According to one embodiment of the present disclosure, these problems may be addressed by configuring the display 212 and the mount or arm 308 (or other support structure for the display 212) to enable the display 212 to move from an angled second position into the first position (flush/parallel with the dashboard 208, and/or facing directly toward the passenger seat 204) in the event of a collision or other accident. Additionally, one or more passenger airbag systems may be designed to deploy an airbag cushion in such a way that the cushion pushes the angled display 212 into the first position as the airbag cushion deploys.

Figure 4A:
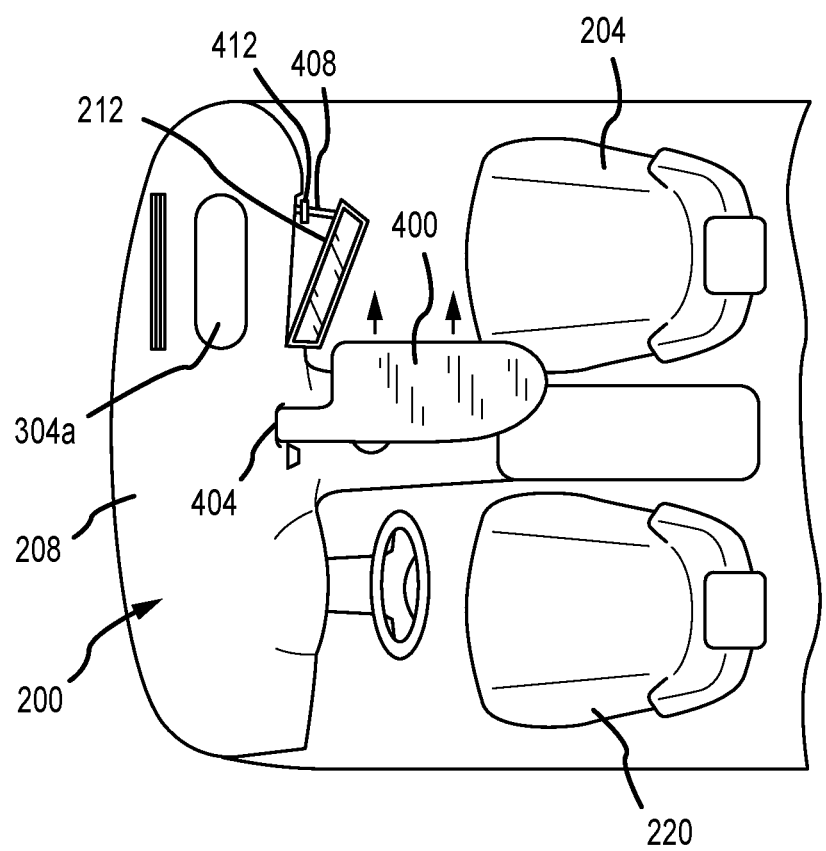
FIG. 4A shows a plan view of a passenger compartment of a vehicle according to another embodiment of the present disclosure, in a first configuration.
Figure 4B:
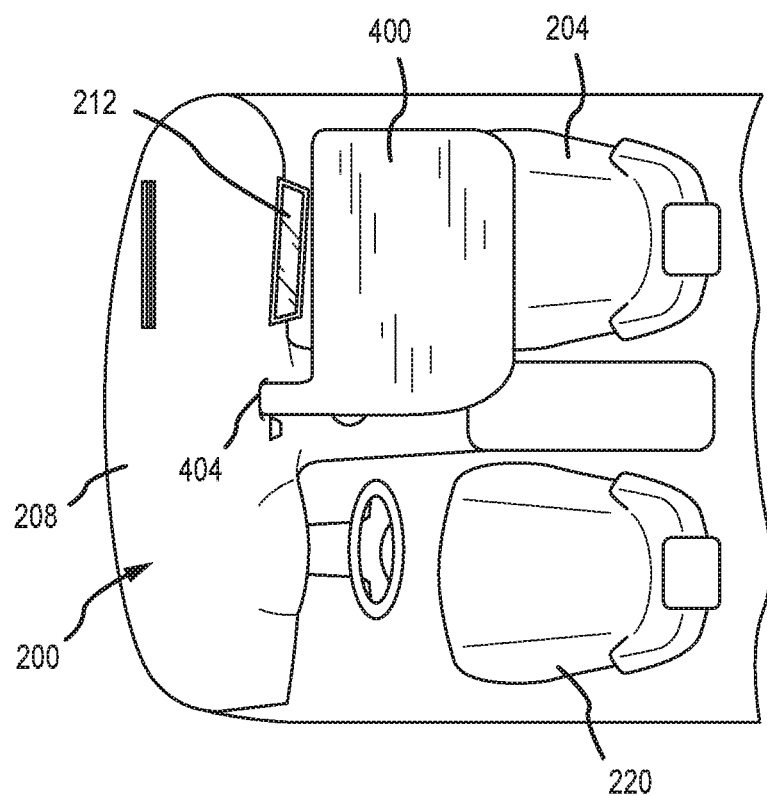
FIG. 4B shows the passenger compartment of FIG. 4A in a second configuration.

For example, and with reference now to FIGS. 4A and 4B, in some embodiments the passenger airbag system may be configured to deploy an airbag cushion 400 through the dashboard at a position 404, which corresponds to the position 304d of FIGS. 3A-3B. Upon crash detection, the airbag cushion 400 deploys first toward the rear of the vehicle 100, and then across the vehicle 100 from the middle of the passenger compartment 200 toward a sidewall of the passenger compartment 200 near the passenger seat 204, so as to fill the space between the display 212 and the passenger seat 204. As the airbag cushion 400 deploys across the vehicle 100, it impacts the display 212 and pushes the display 212 from the second position to the first position, thus beneficially placing the display 212 in a preferred position to act as a backup or support surface for the airbag cushion 400.

According to one embodiment of the present disclosure, the arm, track, or mount 408 that supports the display 212 in the angled second position comprises a pyro latch 412. The pyro latch 412 may be a pyrotechnic, electrical solenoid, or other device for the remote activation of a display position release mechanism. Upon detection of a crash (whether by a crash detection system or sensor included with the pyro latch 412 or with the arm 408, or by a crash detection system included as part of the airbag system or another system of the vehicle 100), the pyro latch 412 triggers, thus breaking the arm 408 or otherwise releasing the display 212 from the arm 408, and allowing the display 212 to rotate back towards the dashboard 208. With the display 212 free to rotate back into the first position, the deployment of the airbag cushion 400 from the middle of the passenger compartment 200 toward the passenger side of the passenger compartment 200 (as shown in FIGS. 4A and 4B) provides the necessary force to push the display 212 from the second position into the first position. By allowing the display 212 to be pushed into the first position from the second position (or from another angled position) in the event of a crash, the airbag cushion 400 can be designed to utilize the display 212 in the first position (as well as parts of the dashboard 208 and/or the front windscreen of the vehicle 100, where necessary), as a support or backup surface, and the problems associated with using an angled display 212 as a support or backup surface can be avoided.

Various methods and/or mechanisms for ensuring proper deployment of the airbag cushion 400 may be utilized. In some embodiments, for example, the airbag cushion 400 may be folded in such a way that inflation thereof causes the airbag cushion 400 to unfold and inflate first in the rearward direction, and then towards the passenger side of the passenger compartment 200. In other embodiments, the airbag cushion 400 may be divided into internal compartments, with vents between compartments arranged so that air or other gas being used to inflate the airbag 400 can only inflate one compartment (e.g., a compartment that, when inflated, extends across the space between the dashboard 208 and the passenger seat 204) after another compartment (e.g., a compartment that extends rearwardly from the position 404 toward the passenger seat 204) is fully inflated, or nearly so.

In still other embodiments, the airbag cushion 400 may comprise a first portion and a second portion, the latter of which may be held in a closed position or configuration by a breakaway band. Once the first portion of the airbag cushion 400 is inflated, the inflating cushion 400 may exert sufficient pressure on the breakaway band to burst the breakaway band and allow the second portion of the airbag cushion 400 to inflate. According to yet another embodiment, a tethered strap may be used to hold a second portion of the airbag cushion 400 in a closed position or configuration, and a timer, sensor, or other device may be used to fire a squib that breaks the tether and releases the strap. In such embodiments, the timer, sensor, or other device may be configured to fire the squib only after the first portion of the airbag cushion 400 has inflated.

As another example of how controlled deployment of an airbag cushion 400 could be effected, a vent between two compartments of the airbag cushion 400 may be closed by a flap, which in turn is connected to a tether that passes through the interior of the airbag cushion 400 and is secured either to a sidewall of the airbag cushion 400 or to another element of the airbag system at a connection point. As the airbag cushion 400 inflates and the distance between the flap and the connection point increases until it is greater than the length of the tether, the tether may pull the flap away from the vent, thus allowing the second compartment of the airbag to inflate.

Still another example of how to achieve controlled deployment of an airbag cushion 400 involves the use of a check valve between two compartments of the airbag cushion 400. The check valve may be designed with a cracking pressure (e.g., a minimum pressure at which the check valve allows flow from the first compartment to the second compartment) equal to a pressure in the first compartment that can be achieved only when the first compartment is fully inflated.

The foregoing description of means for controlling the deployment of an airbag cushion 400 are provided by way of example only. Other methods, mechanisms, or means of controlled airbag deployment, or any combination thereof, may also be used without departing from the scope of the present disclosure.

Figure 5A:
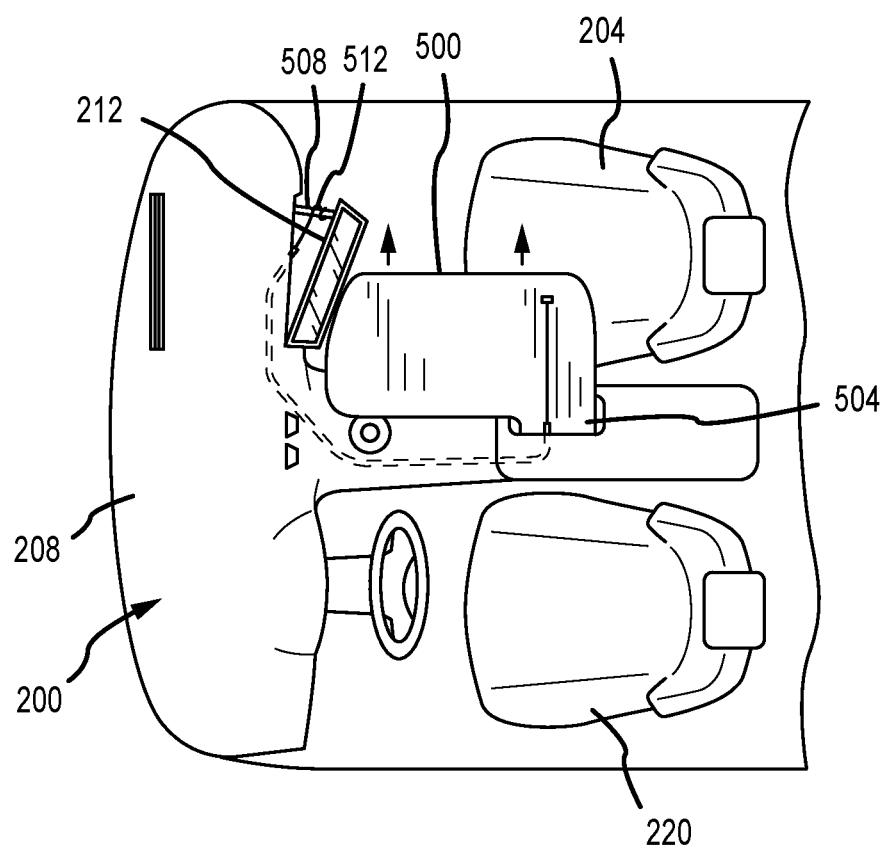
FIG. 5A shows a plan view of a passenger compartment of a vehicle according to another embodiment of the present disclosure, in a first configuration.
Figure 5B:
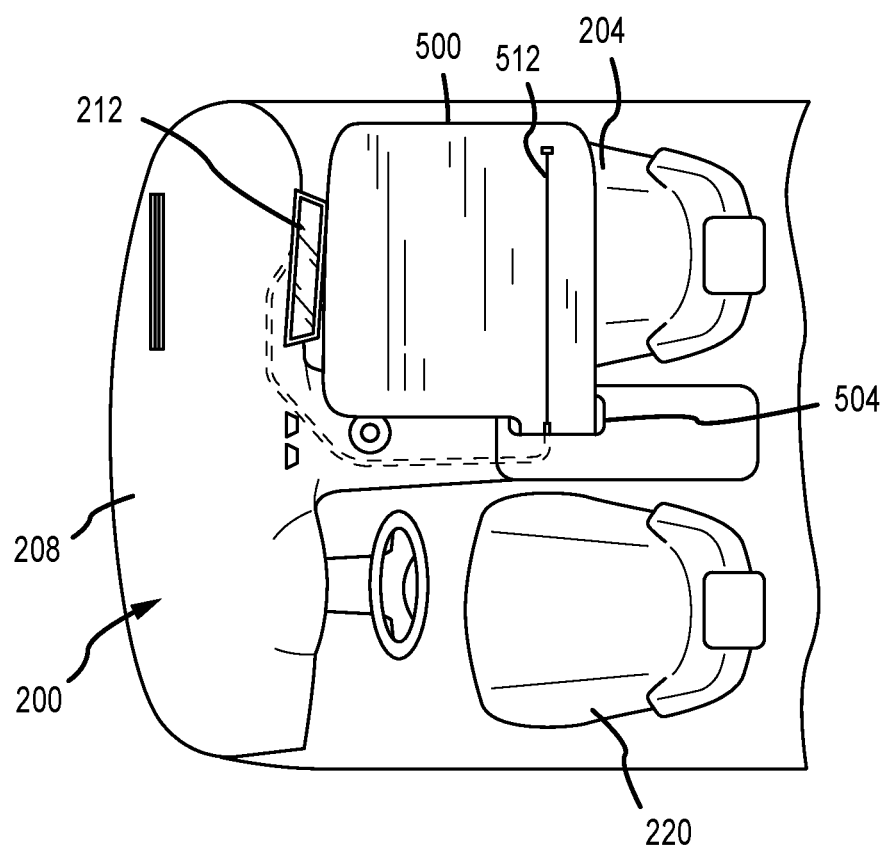
FIG. 5B shows the passenger compartment of FIG. 5A in a second configuration.

FIGS. 5A and 5B depict a passenger compartment 200 similar to that of FIGS. 4A and 4B. In FIGS. 5A and 5B, however, an airbag cushion 500 deploys from the position 504 in a center console of the passenger compartment 200. The airbag cushion 500 may be configured to deploy first towards the dashboard 208, and then across the front of the passenger seat 204 into the space between the passenger seat 204 and the dashboard 208. As the airbag cushion 500 deploys in this direction, the airbag cushion 500 pushes the display 212 from an angled position (shown in FIG. 5A) to a non-angled position (shown in FIG. 5B).

Rather than comprise a pyro latch 412 like the arm 408, an arm or mount 508 used to support the display 212 in the second or angled position may comprise a point or line of weakness that is designed to fail when the airbag cushion 500 inflates and pushes on the display 212. Alternatively, the arm 508 may be directly or indirectly connected to the airbag cushion 500 or another component of the airbag system that includes the airbag cushion 500, in such a way that inflation of the airbag cushion 500 (or another mechanism triggered by the detection of a crash by the airbag system that comprises the airbag cushion 500) pulls, pushes, or otherwise displaces, or breaks, the arm 508, thus allowing the display 212 to be pushed back into the first position by the inflating airbag cushion 500. For example, a Bowden cable may be connected between a portion of the inflating airbag cushion 500 and the arm 508, and used to transmit a force from the inflating airbag cushion 500 to the arm 508 that displaces or breaks the arm 508 and allows the display 212 to be pushed into the first position by the airbag cushion 500. In other embodiments, a cable, tether, or strap other than a Bowden cable may be connected between a portion of the inflating airbag cushion 500 (or another component of an airbag system) and the arm 508, and used to transmit a force to the arm 508 that displaces or breaks the arm 508 and allows the display 212 to be pushed into the first position by the airbag cushion 500.

In some embodiments, the display 212 may not be moveable between a first and second position during normal usage, but may instead be fixed (during normal usage) in an angled position corresponding to the second position described above. However, upon detection of a crash by a crash detection system or sensor in the vehicle 100, an arm or mount such as the arm 508 or another support for the display 212 may comprise an active or passive mechanism that disables or displaces the arm or mount, thus allowing the display 212 to be pushed into a position corresponding to the first position described above (e.g., by an inflating airbag cushion). In other words, the display 212 may be designed to remain in an angled position unless and until the vehicle 100 in which the display 212 is installed is in an accident. If and when that happens, an active or passive mechanism may be used to break, remove, weaken, displace, or otherwise compromise one or more portions of the structure that holds the display 212 in the angled position, so that the display 212 can be pushed into the first position by deployment of an airbag cushion.

Figure 6A:
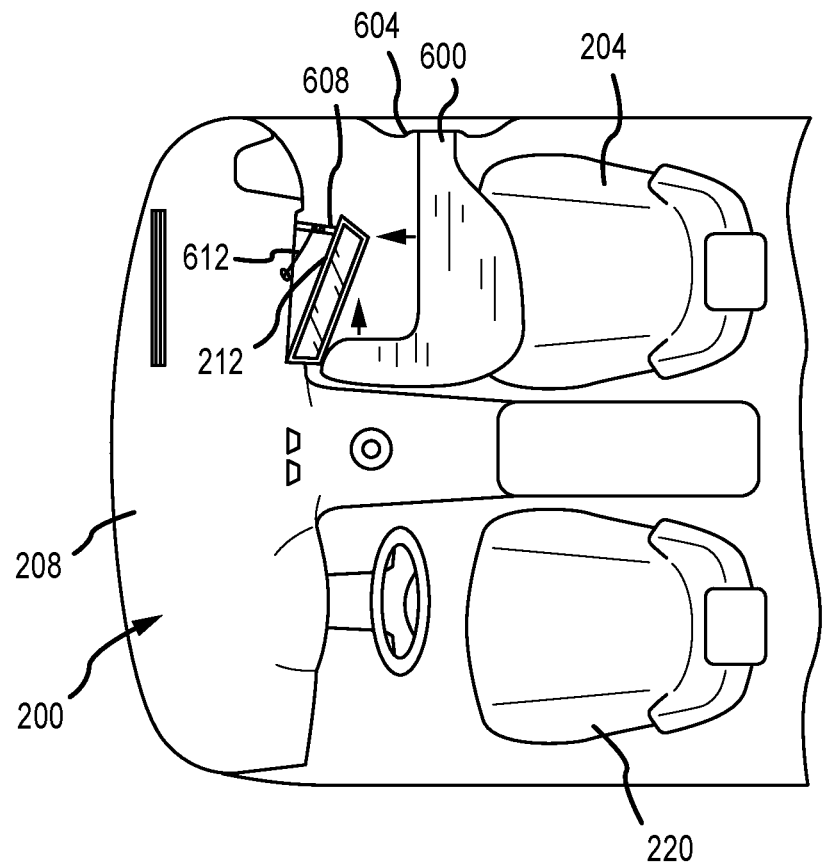
FIG. 6A shows a plan view of a passenger compartment of a vehicle according to another embodiment of the present disclosure, in a first configuration.
Figure 6B:
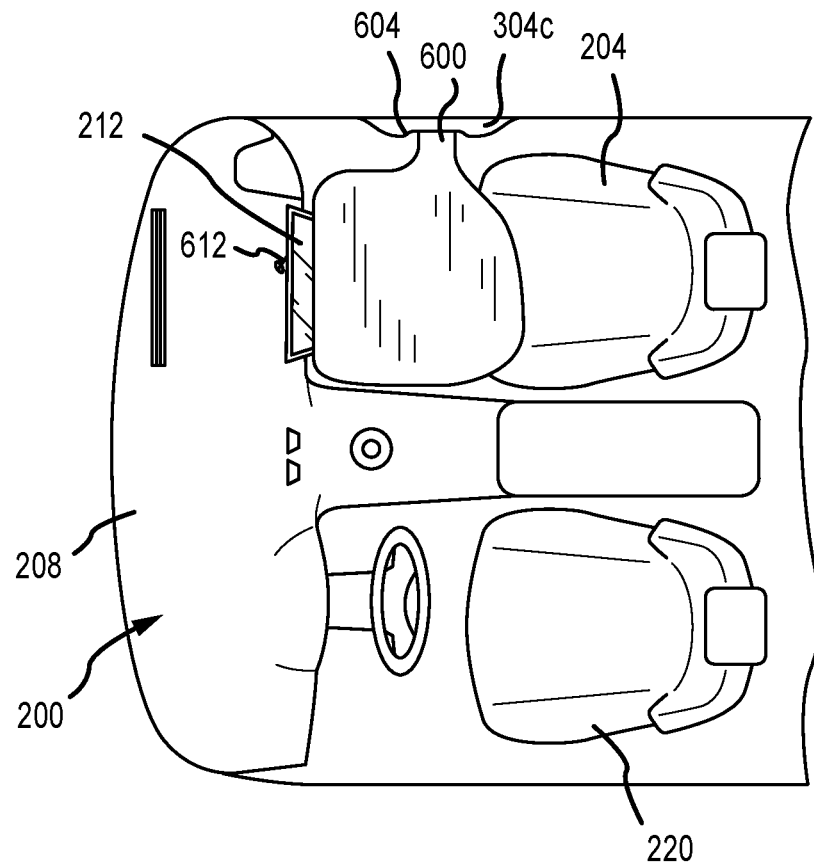
FIG. 6B shows the passenger compartment of FIG. 6A in a second configuration.

Turning now to FIGS. 6A-6B, an airbag cushion 600 may be deployed from a position 604 that corresponds to the position 304c on a door or sidewall of a vehicle 100. In such embodiments, the airbag cushion may be designed to deploy first across the passenger compartment 200, in front of the passenger seat 204 and towards the midline of the passenger compartment 200. A portion of the airbag cushion 600 may then inflate parallel to the midline of the passenger compartment 200 and toward the dashboard 208, so that the airbag cushion 600 forms a reverse "L" shape (as shown in FIG. 6A). The airbag cushion 600 may then inflate both toward the dashboard 208 and back across the passenger compartment 200 from near the midline of the passenger compartment 200 to near the door or sidewall of the passenger compartment 200 at which the position 604 is located, pushing the display 212 back into the first position as the airbag cushion 600 inflates (as shown in FIG. 6B). As in the embodiments of FIGS. 4A-4B and 5A-5B, an arm or mount 608 that secures the display 212 in an angled position comprises a mechanism that disables the arm or mount 608 when a crash is detected by a crash detection system of the vehicle 100, so that the display 212 can be pushed back into a position flush with the dashboard 208 by the airbag cushion 600.

Controlled inflation of the airbag in the manner described above may be achieved using any one or more of the methods and/or mechanisms described above, including through folding the airbag cushion 600 so that it necessarily inflates in the desired manner, providing ducts or passageways within the airbag cushion 600 that must be inflated in order for other ducts, passageways, or compartments to be inflated; including vents between compartments that are selectively opened or closed by flaps that control the order in which compartments of the airbag cushion 600 inflate, and including check valves between compartments of the airbag cushion 600 that, again, control the order in which the compartments of the airbag cushion 600 inflate.

Figure 7A:
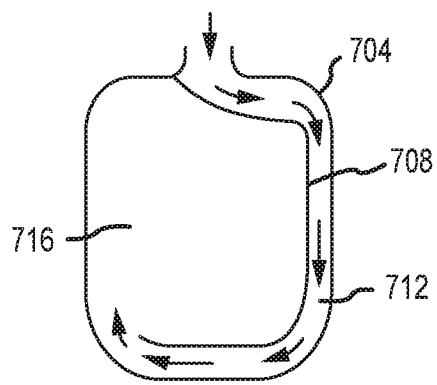
FIG. 7A shows an airbag cushion according to one embodiment of the present disclosure.
Figure 7B:
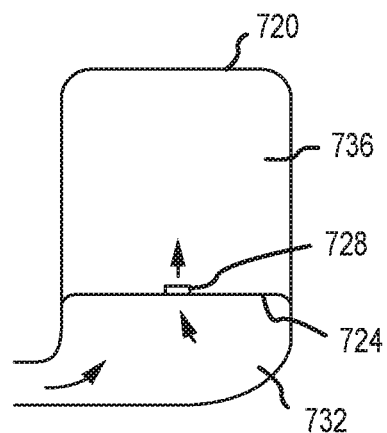
FIG. 7B shows an airbag cushion according to another embodiment of the present disclosure.
Figure 7C:
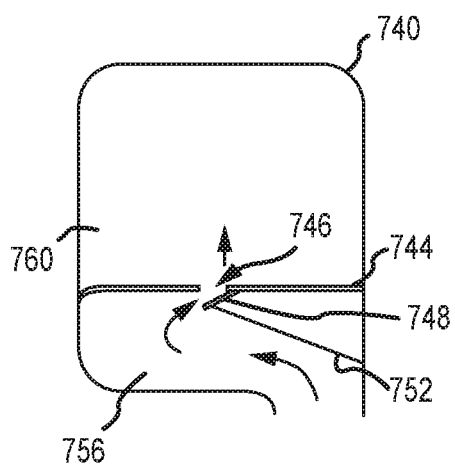
FIG. 7C shows an airbag cushion according to yet another embodiment of the present disclosure.

FIGS. 7A-7C depict several airbag cushions configured for controlled deployment. In FIG. 7A, an airbag cushion 704 comprises a wall 708 that separates a duct 712 from a main compartment 716. The airbag cushion 704 may be tightly folded for storage. Upon detection of a crash, an inflator emits gas into the duct 712, which duct 712 must necessarily inflate, at least partially, before the gas can reach and inflate the main compartment 716. As a result, the airbag cushion 704 will first inflate along the path of the duct 712, before the main compartment 716 inflates. An airbag 704 may be used, for example, in an embodiment such as that depicted in FIGS. 6A-6B, as well as in other embodiments.

In FIG. 7B, an airbag cushion 720 comprises a wall 724 that divides a primary compartment 732 from a secondary compartment 736. A check valve 728 allows gas to pass from the primary compartment 732 to the secondary compartment 736 once the pressure in the primary compartment 732 reaches a threshold level. Upon detection of a crash, gas is exhausted into the primary compartment 732, which inflates first. Once the pressure in the primary compartment 732 reaches the threshold level, the check valve 728 opens and allows the secondary compartment 736 to inflate. The airbag cushion 720 may be used, for example, in an embodiment such as that depicted in FIGS. 4A-4B, as well as in other embodiments.

In FIG. 7C, an airbag cushion 740 comprises a primary compartment 756 and a secondary compartment 760 separated by a wall 744. The wall 744 includes a vent 746 that, during storage and initial inflation of the primary compartment 756, is closed by a flap 748. The flap 748 may be secured in the closed position using, for example, Velcro or a relatively weak adhesive. The flap 748 may also be biased toward the closed position with a spring or other biasing means. A tether 752 having a length X runs between the flap 748 and the airbag cushion 740. The tether is connected to a point on the airbag cushion 740 that is separated from the closed flap 748 by a distance less than X until the primary compartment 756 is nearly or completely inflated, when the distance between the closed flap 748 and the point of attachment of the tether 752 and the airbag cushion 740 increases to a distance greater than X. When this happens, the tether 752, which is made of a material with little if any elasticity, pulls the flap 748 into the open position, thus allowing gas to flow from the primary compartment 756 into the secondary compartment 760. The airbag cushion 740 may be used, for example, in an embodiment such as that depicted in FIGS. 5A-5B, as well as in other embodiments.

In some embodiments, the flap 748 may not be hinged as shown in FIG. 7C, but may instead be integral with the wall 744 and surrounded by a line of weakness, so that when the tether 752 exerts a force on the flap 744, the flap 744 tears away from the wall 744, leaving an open vent 746 through which gas can pass into and inflate the secondary compartment 760. In other embodiments, an integral flap surrounded by a line of weakness may not require a tether, but may simply be designed to separate from the wall 744 once the pressure within the primary compartment 756 reaches a certain threshold level.

Figure 8A:
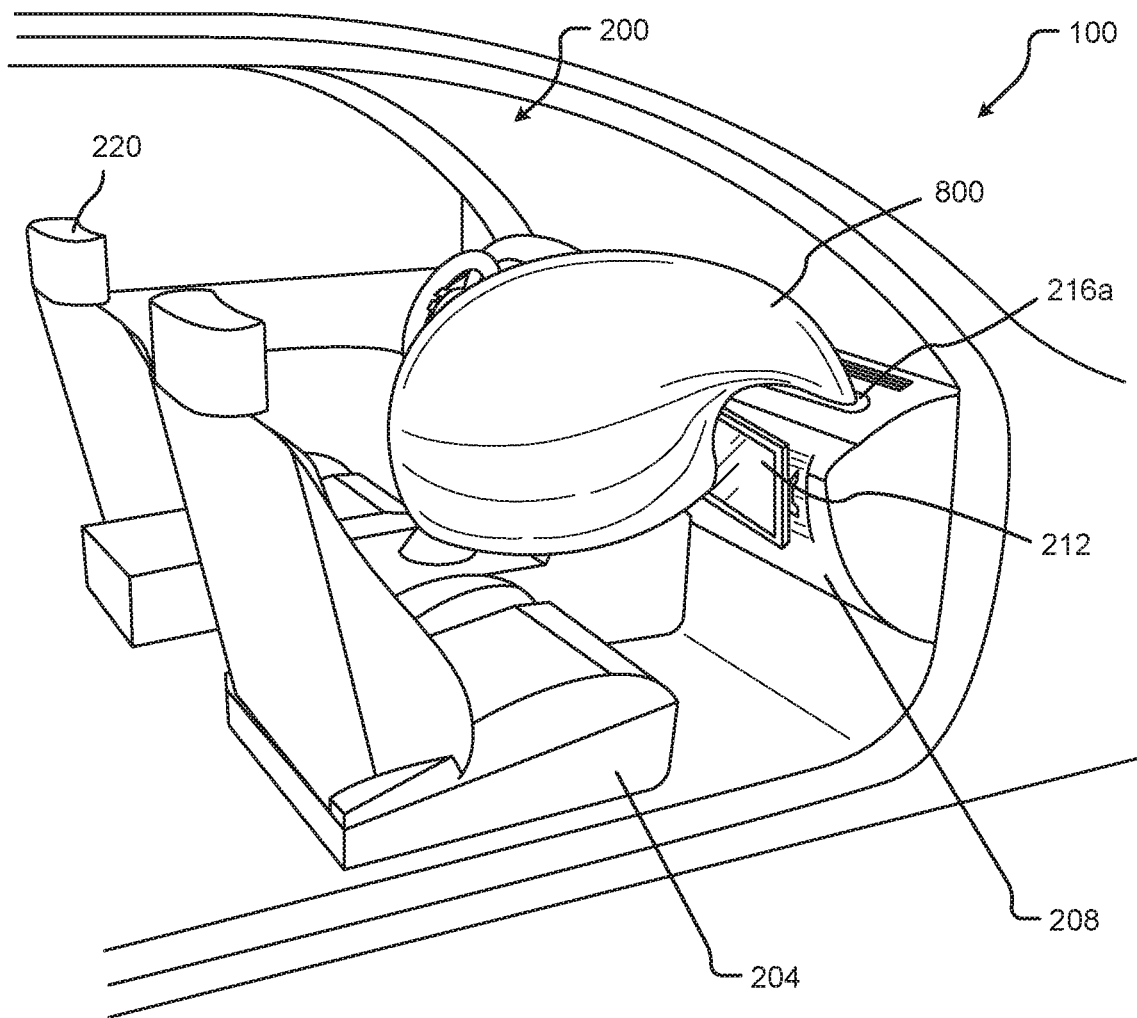
FIG. 8A shows a passenger compartment of a vehicle according to one embodiment of the present disclosure, in a first configuration.
Figure 8B:
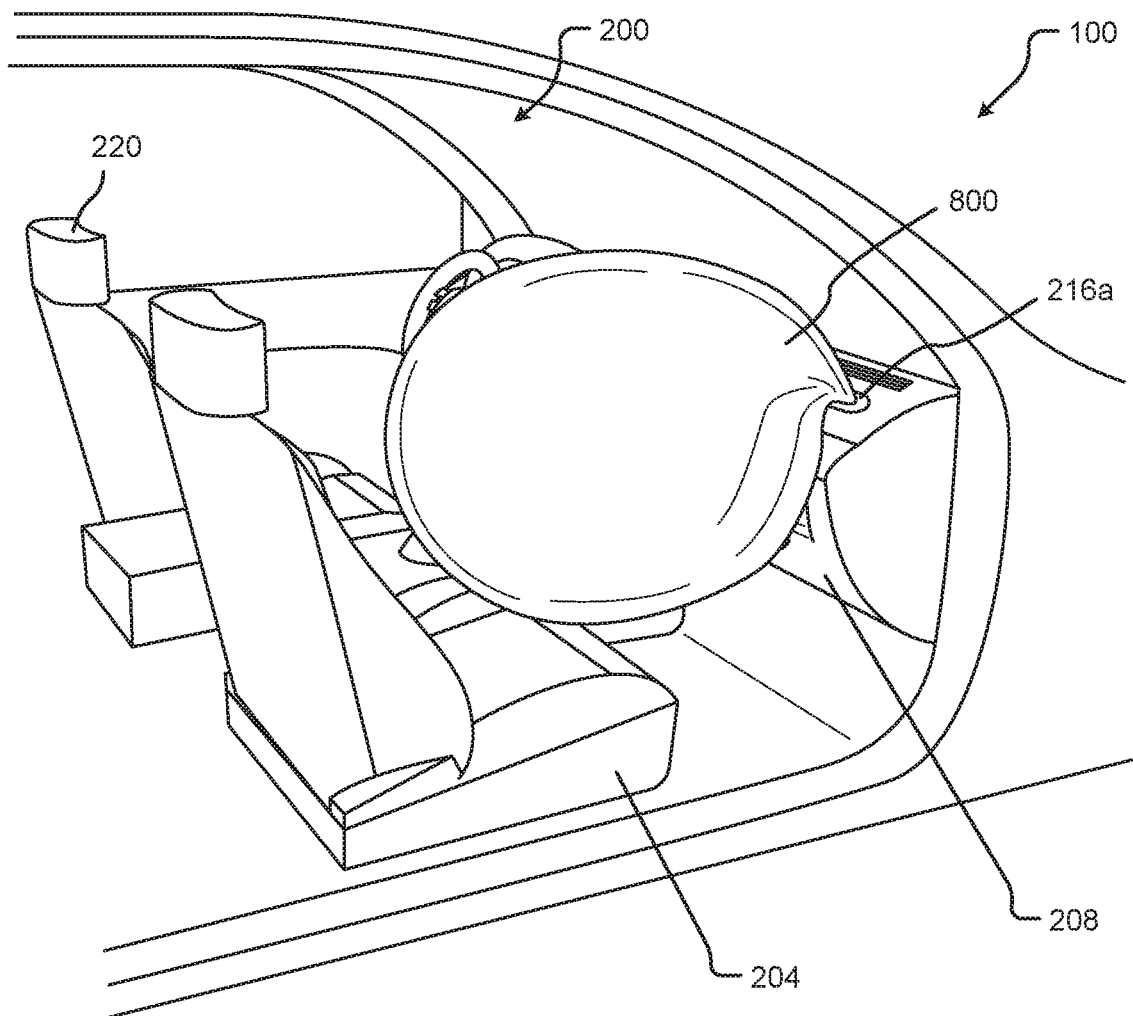
FIG. 8B shows the passenger compartment of FIG. 8A in a second configuration.

Although the foregoing description has focused largely on two-dimensional controlled deployment of an airbag cushion (e.g., where airbag cushion inflation occurs in two or more stages in a single plane), the same principles, methods, and mechanisms described above may also be used to control deployment of an airbag cushion in three dimensions. For example, an airbag cushion 800 deploying from a position 216a on a dashboard 208 located above and behind an angled display 212 may be configured to deploy upward (e.g., parallel to a front windshield) and toward a passenger seat 204 (thus passing over the top of the display 212) before expanding downward on a side proximate the driver seat 220 (as shown in FIG. 8A) and then across the passenger seat 204 and forward toward the display 212 into a fully expanded state, as shown in FIG. 8B. This sequential expansion pushes the display 212 from the second position (as shown in FIG. 8A) into a first position flush with the dashboard 208 (which is the position of the display 212 in FIG. 8B, although the display 212 is not visible due to the airbag cushion 800). In other words, the forward expansion could occur in stages, so that a portion of the airbag cushion nearest a driver seat 220 inflates first, followed by another portion adjacent the first portion but farther from the driver seat 220, and so on until the entire airbag cushion has inflated. In this manner, the airbag cushion incrementally pushes the display 212 back into the first position.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Embodiments include a vehicle, comprising: a driver seat; a passenger seat; a display mounted on a dashboard positioned in front of the passenger seat, the display movable between a first position flush with the dashboard and a second position angled toward the driver seat; and an airbag system comprising an airbag cushion configured to deploy into a space between the passenger seat and the display, the airbag cushion further configured to inflate in a controlled manner that pushes the display from the second position to the first position.

Aspects of the above vehicle include: at least a portion of the airbag cushion is configured to inflate from a side proximate the driver seat to a side distal the driver seat; inflation of the portion of the airbag cushion gradually causes the display to move from the second position to the first position; the airbag cushion is configured to inflate in at least two stages; the airbag cushion comprises an interior duct; the airbag cushion comprises an interior check valve; the airbag cushion comprises an interior vent; the airbag cushion further comprises a flap having a first configuration that covers the interior vent and a second configuration that does not cover the interior vent; a side of the display proximate the driver seat is hingedly mounted to the dashboard, and a side of the display distal the driver seat is held in the second position by an arm; and the vehicle further comprises a pyro latch configured to disable the arm when a crash is detected.

Embodiments also include a vehicle, comprising: a display mounted on a dashboard forward of a passenger seat, the display angled toward a driver seat adjacent the passenger seat and having a first side proximate the driver seat and a second side distal the driver seat, the first side rotatably mounted to the dashboard and the second side held in position by a mount; a crash detection system; and a mechanism for breaking or displacing the mount upon detection of a crash by the crash detection system.

Aspects of the above vehicle further include: the mechanism for breaking or displacing the mount comprises a pyro latch; the mount comprises a line of weakness; the mechanism for breaking or displacing the mount comprises a Bowden cable; the mechanism for breaking or displacing the mount comprises a tether or strap; and the first side is mounted to the dashboard with a hinge.

Embodiments further include a vehicle airbag system, comprising: an inflator; a crash detection system that triggers the inflator upon detection of a vehicle crash; and an airbag cushion connected to the inflator, the airbag cushion configured to deploy into a space between a vehicle passenger seat and a display mounted on a vehicle dashboard when the crash detection system detects a vehicle crash, the airbag cushion further configured to exert, during inflation of the airbag cushion, a force on the display that causes the display to rotate from a second position to a first position, the second position angled relative to the dashboard and the first position parallel with the dashboard.

Aspects of the above vehicle airbag system include: the airbag cushion is configured to deploy from the vehicle dashboard; the airbag cushion is configured to deploy from a location between the vehicle passenger seat and a vehicle driver seat; and the airbag cushion is configured to deploy from a vehicle sidewall or a vehicle door.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

What is claimed is:

1. A vehicle comprising:
    a driver seat;
    a passenger seat;
    a display mounted on a dashboard positioned in front of the passenger seat, the display movable between a first position flush with the dashboard and a second position angled toward the driver seat; and
    an airbag system comprising an airbag cushion configured to inflate in a controlled manner that pushes the display from the second position to the first position, the airbag cushion further configured to inflate in at least two stages, each stage corresponding to a separate compartment.

2. The vehicle of claim 1, wherein the airbag cushion comprises an interior duct.

3. The vehicle of claim 1, wherein the airbag cushion comprises an interior check valve.

4. The vehicle of claim 1, wherein the airbag cushion comprises an interior vent.

5. The vehicle of claim 4, wherein a first stage of the at least two stages corresponds to a primary compartment, a second stage of the at least two stages corresponds to a secondary compartment, and the airbag cushion further comprises a wall separating the primary compartment from the secondary compartment, the wall having the interior vent and a flap, the flap movable between a first configuration that covers the interior vent and a second configuration that does not cover the interior vent.

6. The vehicle of claim 1, wherein the airbag cushion is configured to deploy from the vehicle dashboard.

7. The vehicle of claim 1, wherein the airbag cushion is configured to deploy from a location between the vehicle passenger seat and a vehicle driver seat.

8. The vehicle of claim 1, wherein the airbag cushion is configured to deploy from a vehicle sidewall or a vehicle door.

9. The vehicle of claim 1, wherein at least a portion of the airbag cushion is configured to inflate from a side proximate the driver seat toward a side distal the driver seat.

10. The vehicle of claim 9, wherein inflation of the portion of the airbag cushion causes the display to move from the second position to the first position.

11. The vehicle of claim 1, wherein a side of the display proximate the driver seat is hingedly mounted to the dashboard, and a side of the display distal the driver seat is held in the second position by an arm.

12. A vehicle comprising:
    a display mounted on a dashboard forward of a passenger seat, the display movable between a first position in which the display is angled toward a driver seat adjacent the passenger seat and a second position in which the display is substantially parallel to the dashboard; and
    an airbag system comprising an airbag cushion configured to deploy in a controlled manner that pushes the display from the first position to the second position, the airbag cushion including a primary compartment separated from a second compartment by a wall having an interior vent and a flap.

13. The vehicle of claim 12, wherein the flap is movable between a first configuration in which the flap covers the interior vent and a second configuration in which the flap does not cover the interior vent.

14. The vehicle of claim 13, wherein the airbag system further includes a tether that pulls the flap to the second configuration when the primary compartment is substantially inflated.

15. The vehicle of claim 14, wherein the flap is integral to the wall and surrounded by a line of weakness that tears when the tether exerts a force on the flap.

16. A vehicle comprising:
    an airbag system comprising an airbag cushion operatively connected to an inflator and configured to inflate in at least two stages, the airbag cushion including a primary compartment separated from a secondary compartment by a wall having an interior vent and a flap, the flap having a first configuration that covers the interior vent and a second configuration that does not cover the interior vent,
    wherein inflation of the airbag cushion causes a display mounted on a vehicle dashboard to rotate relative to the dashboard from a first position in which the display is angled toward a driver seat and a second position in which the display is oriented substantially parallel to the dashboard.

17. The vehicle of claim 16, wherein the flap is biased toward the first configuration.

18. The vehicle of claim 16, wherein the airbag system further includes a tether that pulls the flap to the second configuration when the primary compartment is substantially inflated.

19. The vehicle of claim 16, wherein the flap is integral to the wall and surrounded by a line of weakness that tears when a tether exerts a force on the flap.

20. The vehicle of claim 16, wherein inflation of the primary compartment begins before inflation of the secondary compartment.

* * * * *